(12) United States Patent
Newsome et al.

(10) Patent No.: US 6,231,299 B1
(45) Date of Patent: May 15, 2001

(54) APPARATUS FOR ALIGNING STACKED DOCUMENTS MOVING ALONG A CONVEYOR

(75) Inventors: John Robert Newsome, 15987 N. 700th St., Shumway, IL (US) 62461; Kenneth Jerome Polarek, Effingham, IL (US)

(73) Assignee: John Robert Newsome, Shumway, IL (US)

( * ) Notice: Subject to any disclaimer, the term of this patent is extended or adjusted under 35 U.S.C. 154(b) by 0 days.

(21) Appl. No.: 09/434,717

(22) Filed: Nov. 5, 1999

(51) Int. Cl.[7] .................................................. B65G 57/11
(52) U.S. Cl. .................. 414/788.9; 414/789; 414/789.9; 414/790.3; 198/624
(58) Field of Search .................................... 414/788, 789, 414/789.9, 790.3, 788.9; 198/624

(56) References Cited

U.S. PATENT DOCUMENTS

| | | |
|---|---|---|
| 3,595,370 | 7/1971 | Fujishiro . |
| 3,761,080 | 9/1973 | Larson . |
| 4,183,704 * | 1/1980 | Steinhart ................................ 414/31 |
| 4,347,927 | 9/1982 | Landes . |
| 4,364,466 * | 12/1982 | Mojden ................................ 198/459 |
| 4,494,901 | 1/1985 | Wood . |
| 4,548,399 | 10/1985 | Heider et al. . |
| 4,667,809 | 5/1987 | Raybuck . |
| 4,767,116 | 8/1988 | Eberle . |
| 4,927,321 | 5/1990 | Lucas . |
| 5,131,804 * | 7/1992 | Focke et al. .......................... 414/796 |
| 5,292,223 | 3/1994 | Meschi . |
| 5,433,582 * | 7/1995 | Medina ............................. 414/788.3 |
| 5,641,052 * | 6/1997 | Lazzarotti et al. .................... 198/445 |

FOREIGN PATENT DOCUMENTS

| | | |
|---|---|---|
| 2017375 | 10/1971 | (DE) . |
| 956664 | 4/1964 | (GB) . |

* cited by examiner

Primary Examiner—Joseph A. Fischetti
(74) Attorney, Agent, or Firm—Alston & Bird LLP

(57) ABSTRACT

An apparatus for forming vertical stacks of documents and then conveying the stacks serially along a conveyor to further processing stations. The stacks are rapidly ejected onto a conveyor which is driven at a relatively slow delivery speed, and to avoid longitudinal shingling of the stacks caused by their rapid ejection onto the conveyor, and to correct any lateral misalignment of each stack, there is provided a pair of rotatably mounted resilient guide rolls along respective opposite sides of the conveyor for rotation about vertical axes. The rolls are spaced apart a distance such that the rolls resiliently engage the opposite sides of the stacks as they pass therebetween. Also, the guide rolls are rotated at an initial peripheral speed which closely approximates the speed of the advancing stacks when the stacks engage the two guide rolls, which serves to square the stacks. The peripheral speed of the guide rolls is reduced while the rolls are in engagement with each stack, so as to decelerate each stack to the delivery speed of the conveyor.

15 Claims, 4 Drawing Sheets

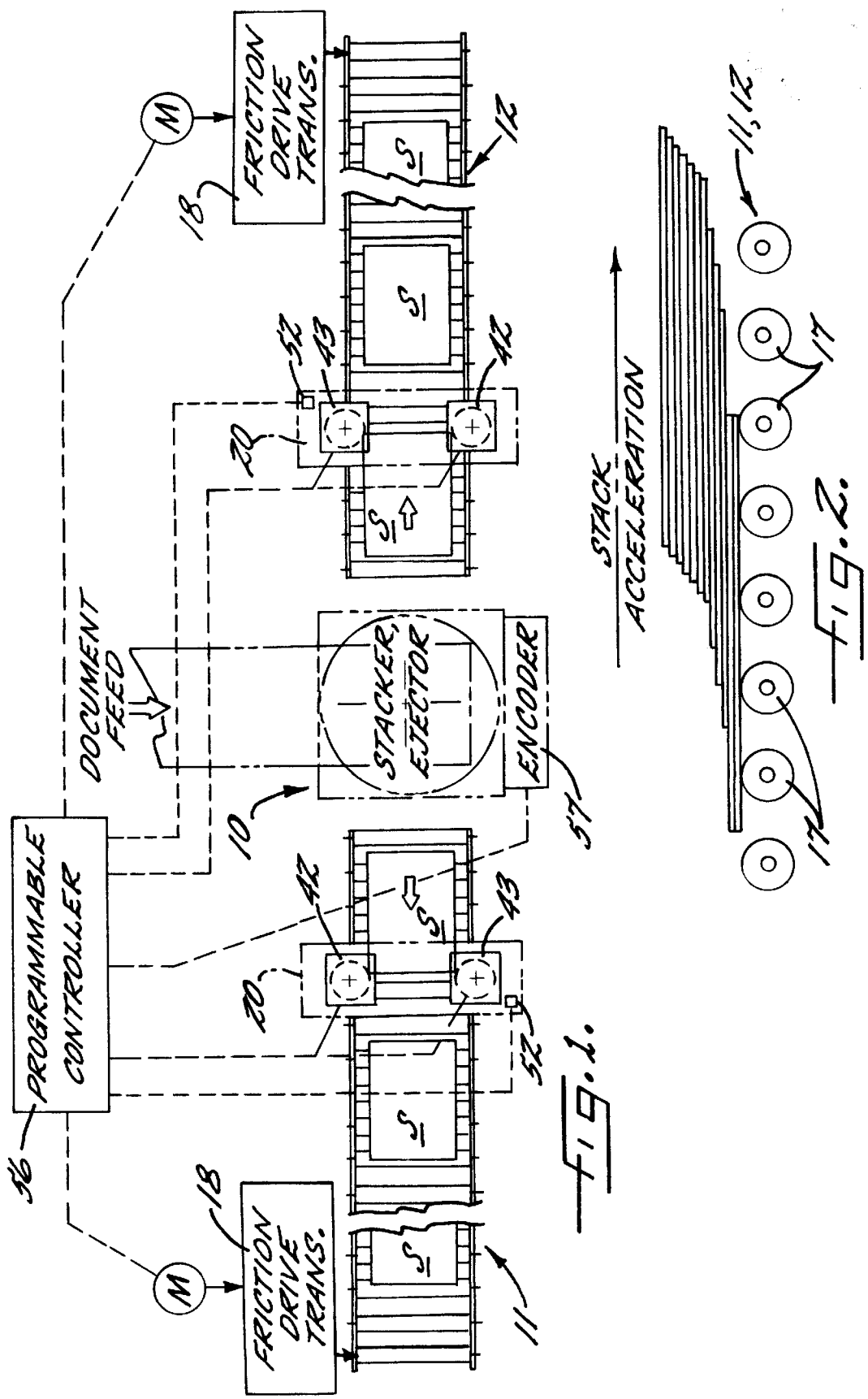

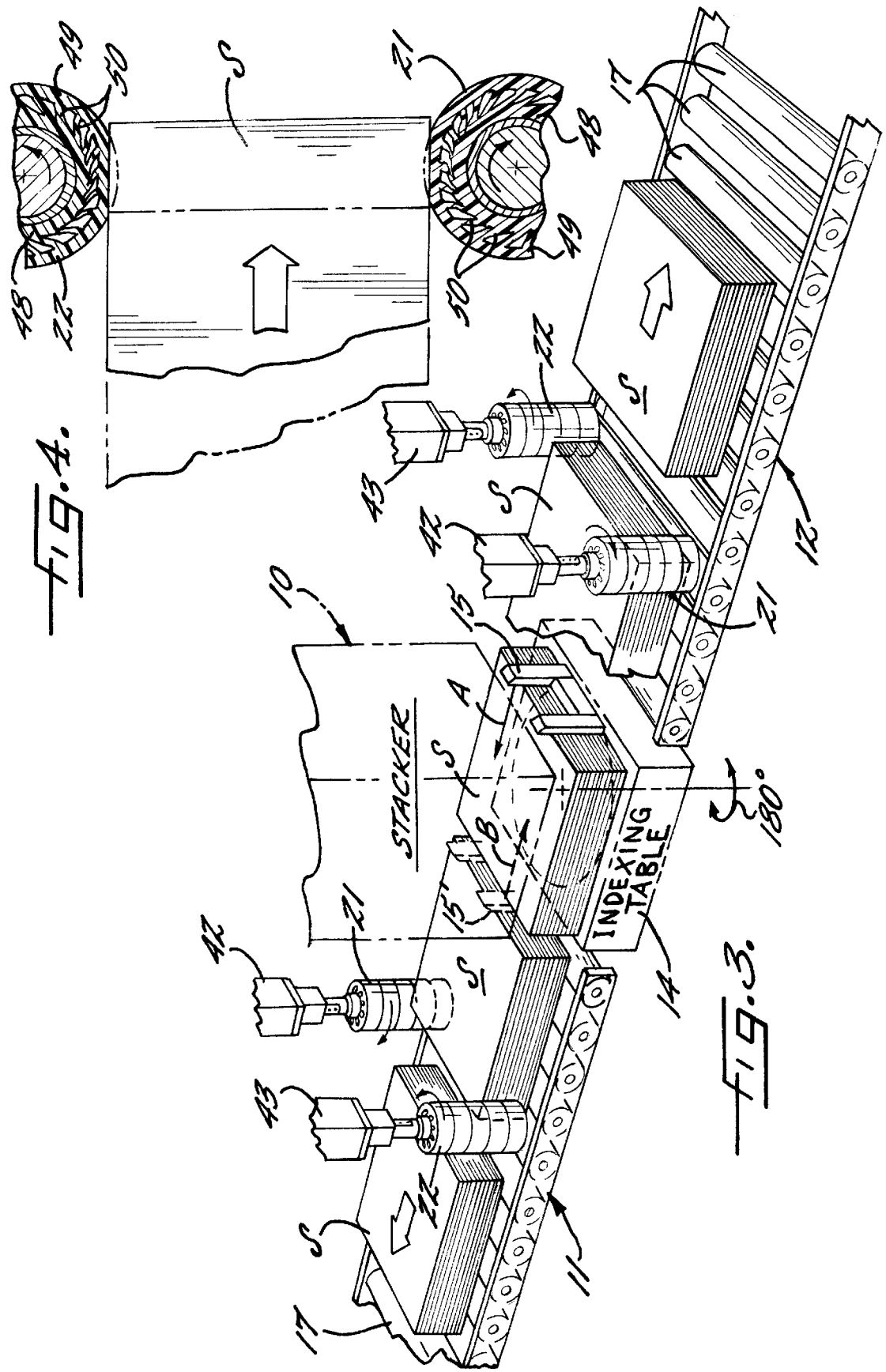

APPARATUS FOR ALIGNING STACKED DOCUMENTS MOVING ALONG A CONVEYOR

BACKGROUND OF THE INVENTION

The present invention relates to an apparatus for forming vertical stacks of documents, such as magazines or newspapers, from documents which are sequentially delivered to the apparatus, and for then conveying the stacks sequentially along a path of travel while maintaining the vertical alignment of the stacks.

Modern stack forming machines are able to rapidly form vertical stacks of documents from documents sequentially delivered thereto, and to eject the stacks horizontally onto a longitudinally extending driven conveyor by which the stacks are transported to further processing operations, such as binding and labeling stations. When such machines are run at high speed, the ejector must be cycled very rapidly, and the rapid ejection of the stacks tends to cause misalignment or shingling in the forward or longitudinal direction, as illustrated in FIG. 2 of the accompanying drawings. Also, the documents may slide laterally.

In an attempt to alleviate the shingling and alignment problems, it has been proposed to mount lugs or paddles on the conveyor which engage the leading end of each stack causing it to square up, and the lugs or paddles are then moved out of the way to permit the stack to continue its advance. This arrangement has not been totally satisfactory however since the movement of the lugs or paddles requires significant equipment and time, and thus production speeds are limited.

It is accordingly an object of the present invention to provide an apparatus for forming stacks of documents and ejecting the formed stacks onto a longitudinally extending conveyor at high production speeds, and which is able to correct and/or maintain the vertical alignment of the stacks as they are conveyed along the conveyor.

It is also an object of the present invention to provide an apparatus of the described type which squares the stacks in both the longitudinal and lateral directions.

SUMMARY OF THE INVENTION

The above and other objects and advantages of the present invention are achieved by the provision of an -apparatus for transporting vertical stacks of documents while maintaining the vertical alignment of each stack, which comprises a longitudinally extending conveyor which defines a support surface for supporting longitudinally moving stacks of documents, and a pair of rotatably mounted guide rolls mounted along respective opposite sides of the conveyor for rotation about respective upright axes, so as to define a gate through which the moving stacks of documents pass. A variable speed drive motor is provided for rotating each of the guide rolls about their respective axes.

The conveyor onto which the stacks are ejected is typically driven at a relatively slow speed which is set to correspond to the infeed speed of the downstream processing equipment. However, the stacks must be rapidly ejected onto the conveyor to achieve the desired production output, and thus the ejection speed is preferably above the delivery speed of the conveyor. To accommodate these differing requirements, a controller is provided which is operatively connected so as to control the rotational speed of each of the drive motors of the guide rolls such that during passage of each stack through the gate, the guide rolls have an initial peripheral speed which closely approximates the advancing speed of the stack, and the initial peripheral speed is reduced during the passage of the stack through the gate so as to decelerate the stack, preferably to the delivery speed of the conveyor. A sensor is provided for sensing the advancing speed of the stacks of documents as they move longitudinally along the conveyor toward the gate, and the controller is operatively connected to the sensor and to each of the drive motors of the guide rolls for controlling the initial rotational speed of each of the guide rolls as a function of the advancing speed of the stacks as the stacks advance toward the gate. The engagement of the stack is preferably designed to occur at, or a short time after, the time the ejecting mechanism has reached its full forward stroke. As a result, the engagement of the stack with the guide rolls acts to square the stack.

The conveyor preferably comprises a plurality of parallel conveyor rollers which define the support surface, a conveyor drive motor, and a friction drive transmission between the conveyor drive motor and the conveyor rollers whereby the conveyor rollers are rotatably driven by the conveyor drive motor so as to allow slippage therebetween. Thus the mismatched speeds of the stacks and the conveyor as the stacks move through the gate can be accommodated.

BRIEF DESCRIPTION OF THE DRAWINGS

Some of the objects and advantages of the present invention having been stated, others will appear as the description proceeds, when considered in conjunction with the accompanying drawings, in which:

FIG. 1 is a schematic plan view of a stacking and conveying apparatus which embodies the features of the present invention;

FIG. 2 is a schematic side elevation view of the conveyor and illustrating the longitudinal shingling of the documents which is corrected or avoided with the present invention;

FIG. 3 is a schematic perspective view of the apparatus shown in FIG. 1;

FIG. 4 is a fragmentary plan view of a stack of documents as it passes through the straightening gate defined by the guide rolls of the present invention;

DETAILED DESCRIPTION OF THE PREFERRED EMBODIMENT

Figure 5:
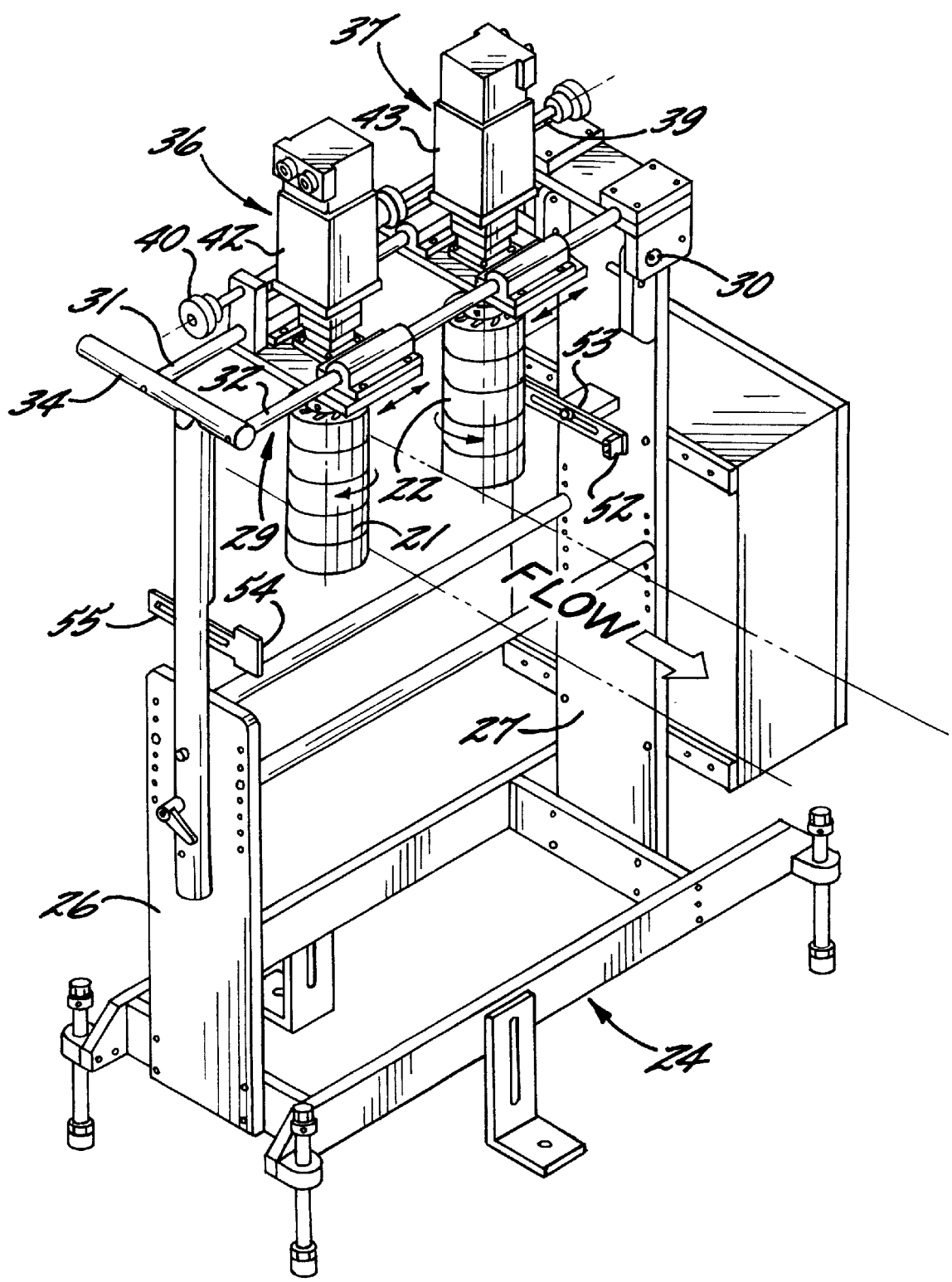
FIG. 5 is a perspective view of a straightening gate of the present invention.

Referring more particularly to the drawings, FIGS. 1 and 3 illustrate a preferred embodiment of the apparatus of the invention, and which comprises a stack forming and ejecting device 10 which is capable of forming vertical stacks of documents from documents sequentially delivered thereto, and then ejecting the stacks sequentially onto the two oppositely directed conveyors 11, 12. The stack forming device 10 includes an indexing table 14 which is rotatable through 180°, and an ejector 15 is attached to the indexing table so that the ejector sequentially ejects the stacks S in opposite directions onto the two oppositely directed conveyors. The ejector 15 typically comprises an air cylinder.

As shown in FIG. 3, the ejector 15 is ready to eject the stack on the table 14 in the direction A, and then the table 14 is indexed so that the ejector is at 15' and ready to eject the next stack in the direction B.

A stack forming device 10 as described above is known in the art, and is sold under the designation RIMA book stacker.

Each of the conveyors 11, 12 extends in a longitudinal direction, and forms a generally horizontal support surface for supporting and moving the stacks of documents S to downstream processing stations, such as packaging and labeling stations (not shown). Each conveyor is composed of a plurality of parallel conveyor rollers 17 which define the support surface, and a variable speed drive motor M is provided for driving the rollers via a friction drive or slip transmission 18. The friction drive transmission 18 is conventional, and it allows slippage between the drive motor M and the individual rollers 17 in the event of mismatched speeds. The speed of the conveyor rollers is usually set to match the infeed speed of the downstream processing stations.

A stack aligning framework 20 is positioned along each conveyor 11, 12 at a location spaced a short distance from the stack forming and ejecting device 10. Each stack aligning framework 20 rotatably mounts a pair of guide rolls 21, 22 along respective opposite sides of the conveyor for rotation about respective upright, i.e., vertical, axes. The rolls 21, 22 thus define a gate through which the stacks pass after they are ejected onto the conveyor by the ejector 15.

Figure 6:
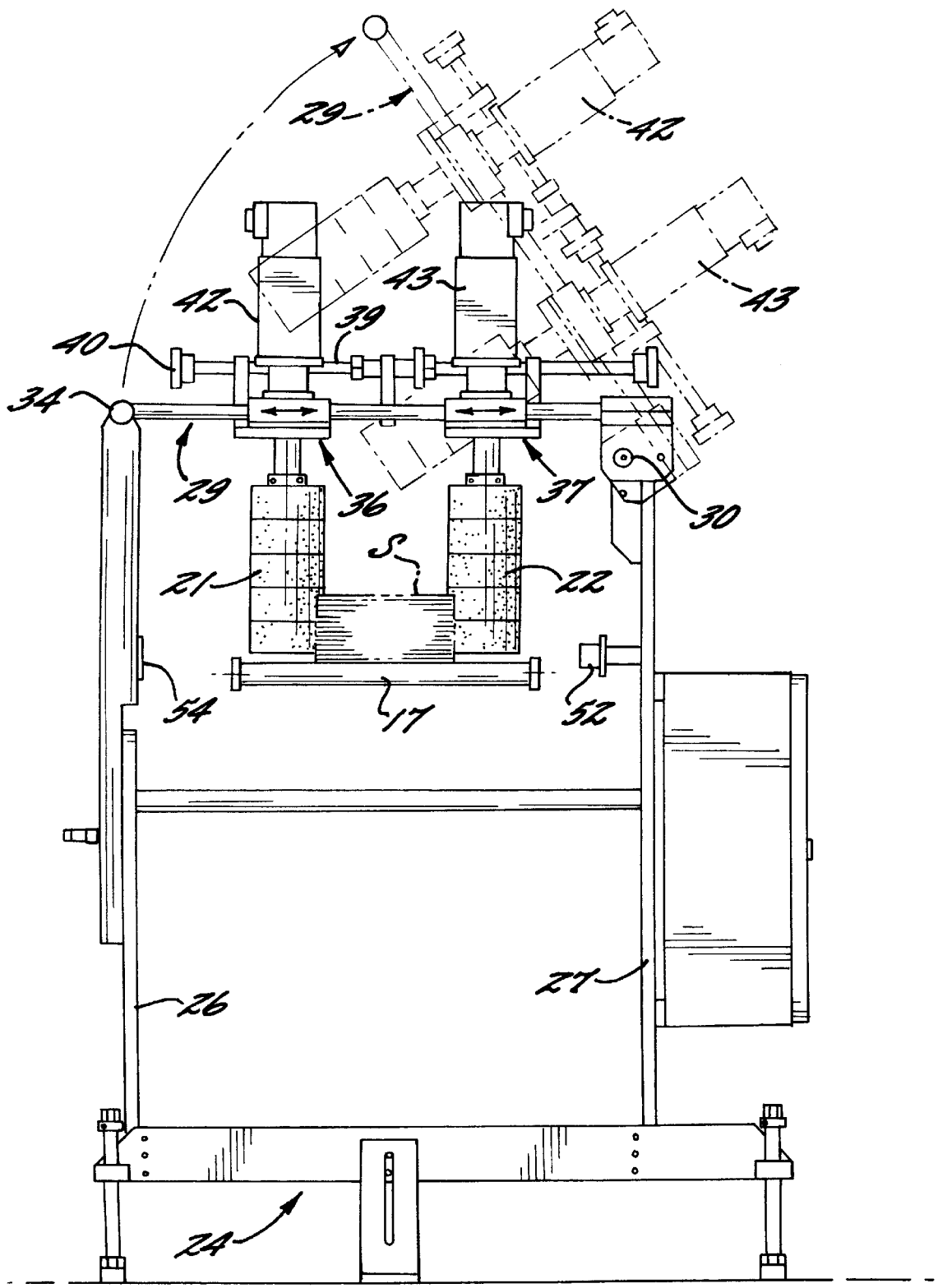
FIG. 6 is a front elevation view of the straightening gate shown in FIG. 5, and illustrating the pivotal mounting of the guide rolls in dashed lines.

The two stack aligning frameworks 20 of the two conveyors are of like construction, as illustrated in FIGS. 5 and 6. In each case, an upright frame 24 is provided, which rests upon the floor by adjustable feet and which includes two upright side members 26, 27 which straddle the conveyor. A transverse upper frame member 29 is pivotally mounted to the upright side member 27 for pivotal movement about a horizontal axis 30 which is located above one side of the conveyor, so that the frame member 29 can be pivoted upwardly as seen in dashed lines in FIG. 6, to provide improved access to the other components of the apparatus.

The upper frame member 29 includes two parallel rods 31, 32 which extend transversely between the upright side member 26, 27, and the ends of the rods 31, 32 which are opposite the pivotal axis 30 mount a cross bar 34 which is positioned to rest upon the upright side member 26 when the frame member 29 is pivoted to its operative position as seen in FIG. 5.

A pair of carriages 36, 37 are slideably mounted on the two rods 31, 32. Also, the two carriages 36, 37 are interconnected by a control rod 39 having oppositely threaded portions which threadedly engage the carriages respectively. The rod 39 is manually rotatable by a knob 40, whereby the lateral separation of the carriages may be adjusted.

Each carriage 36, 37 mounts a variable speed servo motor 42, 43 which has a vertically disposed output shaft, and a guide roll 21, 22 is coaxially mounted on the lower end of each output shaft. As illustrated, the guide rolls 21, 22 each comprise a plurality of individual soft foam rubber roll segments coaxially mounted on the output shaft, note FIG. 6.

Alternatively, the rolls 21, 22 may be formed of a unitary soft foam rubber structure. In either embodiment, the rolls 21, 22 are each radially resilient, and of a construction commonly called "crush" rolls. As best seen in FIG. 4, the rolls in cross section each comprise an outer peripheral plastic segment composed of an inner ring 48, an outer ring 49, and a series of tangentially inclined ribs 50 extending therebetween. This construction permits the outer periphery to be readily deflectable, as is seen in FIG. 4, so as to firmly engage the stacks of documents passing through the gate without damaging the stacks. Also, the resilient rolls act to laterally align the documents in the stacks as they pass through the gate. Each roll typically has a diameter of about 4 inches and a height of about 10 inches.

As best seen in FIG. 4, the lateral separation of the rolls 21, 22 is typically adjusted by rotation of the knob 40 so that their separation is slightly less than the width of the stacks of documents. Thus the rolls 21, 22 are somewhat radially compressed as the stacks move through the gate defined by the guide rolls.

Each stack aligning framework 20 includes a photo sensor 52 mounted on a longitudinally adjustable bracket 53 on side member 27, and a cooperating reflector plate 54 mounted on a longitudinally adjustable bracket 55 on the side member 26. The beam from the photo sensor 52 thus extends laterally across the longitudinal path of travel of the stacks, at a location just downstream of the guide rolls 21, 22. Also, the beam is interrupted as each stack enters the gate formed by the guide rolls. As further described below, the photo sensor 52 is provided to approximately indicate when the ejector has reached its maximum forward advance and when the stack has entered the gate.

The apparatus of the invention also comprises a controller 56 for controlling the operation of the servo motors 42, 43. For supplying the desired information to the controller 56, there is provided a sensor for sensing the advancing speed of the stacks of documents as they move longitudinally along the conveyor toward the gate formed by the two guide rolls 21, 22. More particularly, in the illustrated embodiment, this sensor is in the form of an encoder 57 which is mounted on the ejector 15 so as to monitor the speed of the air cylinder. The output of the encoder 57 is delivered to the controller 56, which acts to control the speed of the two servo motors 42, 43 so that the peripheral speeds of the two guide rolls 21, 22 closely approximate of the speed of the moving stacks as they approach the gate. Such monitoring of the speed of the stacks is useful, since the speed may vary depending on the size of the stacks or the pressure delivered to the air cylinder.

During the operation of the apparatus, the air cylinder ejects the stacks S being formed first onto one conveyor 11 and then onto the other 12. With each ejection, the speed is sensed by the encoder 57, and the speed of the pair of guide rolls 21, 22 of the associated conveyor is adjusted so that the guide rolls have an initial peripheral speed which closely approximates the advancing speed of the stack approaching the gate.

To handle the full production capacity of the stacker, the ejector 15 is usually operated so that its advance speed, and thus the initial speed of the moving stack, is well above the delivery speed of the conveyor rollers 17. Also, the ejector 15 has a stroke length whereby when the ejector reaches its full forward position, the leading edge of the ejected stack S has just engaged the guide rolls 21, 22, although a short delay in reaching the guide rolls is acceptable. Stated in other words, the guide rolls 21, 22 are positioned so as to be longitudinally spaced from the full forward position of the ejector 15, a distance which closely approximates the longitudinal length of the stack of documents being processed. Thus the stack engages the guide rolls at or immediately after the moment the ejector withdraws, and the guide rolls are then driven via the servo motors 42, 43 so as to closely approximate the maximum advancing speed of the stack ejector 15 and thus the speed of the advancing stack.

The engagement of the leading edge of the stack with the rotating guide rolls 21, 22 acts to square the stack, both longitudinally and laterally. Also, the friction driven conveyor rollers 17 allow slippage of the rollers to match the speed of the stack.

Shortly after the stack has engaged the two guide rolls 21, 22, the beam of the photo sensor 52 is broken, causing it to issue a signal which causes the speed of the guide rolls 21, 22 to be reduced, to thereby decelerate the stack. Preferably, the reduced speed closely approximates the delivery speed of the conveyor, which as noted above, is set to match the infeed speed of the downstream processing equipment and is lower than the ejection speed of the stack. Thus the stack is decelerated to the lower speed of the delivery conveyor, as it passes between the guide rolls 21, 22 of the gate, and so that the integrity of the stack is maintained.

When the beam of the sensor 52 is re-established, indicating that the stack has passed completely through the guide rolls, the controller 56 signals the servo motors 42, 43 to resume their original high speed rotation, and the apparatus is then ready to receive the next stack.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for transporting vertical stacks of documents while maintaining the vertical alignment of each stack, comprising
    a longitudinally extending conveyor which defines a support surface for supporting longitudinally moving vertical stacks of documents,
    an ejector for sequentially ejecting vertical stacks of documents longitudinally onto the conveyor at a predetermined speed,
    a pair of rotatably mounted generally cylindrical guide rolls mounted along respective opposite sides of the conveyor for rotation about respective upright axes, so as to define a gate through which the moving stacks of documents pass, and with the pair of guide rolls being laterally spaced apart a distance so as to engage opposite sides of the moving stacks of documents,
    a variable speed drive motor means for rotating each of the guide rolls about their respective axes, and
    a controller operatively connected to the drive motor means of the guide rolls for controlling the rotational speed of each of the guide rolls such that during the passage of each stack through the gate, the guide rolls have an initial peripheral speed which closely approximates the predetermined speed of the stack when the stack engages the guide rolls, and the initial peripheral speed is reduced during the passage of the stack through the gate so as to decelerate the stack.

2. The apparatus as defined in claim 1 wherein the conveyor comprises a plurality of parallel conveyor rollers which define said support surface, and an adjustable conveyor drive for rotating said conveyor rollers.

3. The apparatus as defined in claim 2 wherein said conveyor drive is operatively connected to said conveyor rollers via a friction drive transmission which permits the conveyor rollers to slip.

4. The apparatus as defined in claim 3 wherein the conveyor rollers have a driven peripheral speed which is less than said predetermined speed of said stacks of documents, and wherein the reduced peripheral speed of the guide rolls is approximately equal to the driven peripheral speed of the conveyor rollers.

5. The apparatus as defined in claim 2 wherein the controller comprises a sensor for sensing the advancing speed of each stack of documents as it moves longitudinally along the conveyor toward said gate.

6. The apparatus as defined in claim 5 wherein the controller further comprises a second sensor for detecting when the stack of documents engages the guide rolls and then causing the speed of the guide rolls to be reduced.

7. The apparatus as defined in claim 1 wherein the pair of guide rolls are mounted on a frame member, with the rolls each being mounted for adjustable movement in a lateral direction such that the lateral spacing between the guide rolls can be adjusted to accommodate stacks of varying width.

8. The apparatus as defined in claim 7 wherein the frame member is pivotally mounted to a fixed frame for movement about a horizontal axis which is located generally along one side of the conveyor, so that the frame member can be pivoted upwardly.

9. An apparatus for forming vertical stacks of documents and conveying the stacks sequentially along a path of travel while maintaining the vertical alignment of the stacks, and comprising
    a stack forming device for forming vertical stacks of documents from documents serially delivered thereto,
    a longitudinally extending conveyor having an entry end positioned adjacent the stack forming device, with said conveyor having a generally horizontal support surface for supporting a moving vertical stack of documents,
    an ejector for sequentially ejecting formed vertical stacks of documents from the stack forming device and onto the entry end of the conveyor at a predetermined speed,
    a pair of rotatably mounted generally cylindrical guide rolls mounted along respective opposite sides of the conveyor for rotation about respective upright axes, so as to define a gate through which the stacks of documents supported on the support surface of the conveyor may pass, and with the lateral spacing of the guide rolls being adjustable, a variable speed drive motor means for rotating each of the guide rolls about their respective axes, a sensor for sensing the advancing speed of the stacks of documents as they move longitudinally along the conveyor toward the gate, and a controller operatively connected to the sensor and to the drive motor means for controlling the rotational speed of each of the guide rolls as a function of the advancing speed of the stacks as sensed by the sensor.

10. The apparatus as defined in claim 9 wherein the controller is programmed to control the drive motor means of the guide rolls so that the guide rolls have a peripheral speed which closely approximates the predetermined speed of the stack of documents advancing toward the gate.

11. The apparatus as defined in claim 10 further comprising a second sensor for detecting when the stack of documents engages the guide rolls and then signaling the controller to reduce the speed of the guide rolls so that the stack is decelerated as the stack moves through the gate.

12. The apparatus as defined in claim 11 wherein the conveyor comprises a drive motor, a plurality of parallel conveyor rollers which define said support surface, and a friction drive transmission between said drive motor and said conveyor rollers whereby said conveyor rollers are rotatably driven by said drive motor so as to allow slippage therebetween.

13. The apparatus as defined in claim 12 wherein the conveyor drive motor is adjustable in speed and is adjusted so that the conveyor has a delivery speed which is less than said predetermined speed, and wherein the reduced speed of the guide rolls results in a peripheral speed of the guide rolls which closely approximates the delivery speed of the conveyor.

14. The apparatus as defined in claim 13 wherein the guide rolls are each radially resilient so as to permit them to be radially flattened by the passage of a stack of documents through the gate.

15. The apparatus as defined in claim 10 wherein the ejector has a forward stroke which extends to a full forward position, and wherein the guide rolls are positioned so as to be spaced from the full forward position a distance which closely approximates the longitudinal length of the stack of documents.

* * * * *